United States Patent
Holder et al.

(10) Patent No.: US 12,013,881 B2
(45) Date of Patent: Jun. 18, 2024

(54) METHOD, DEVICE, AND SYSTEM FOR DETERMINING A WEATHER AREA

(71) Applicant: Bayerische Motoren Werke Aktiengesellschaft, Munich (DE)

(72) Inventors: Stefan Holder, Munich (DE); Thomas Schutzmeier, Unterhaching (DE); Andreas Winckler, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 367 days.

(21) Appl. No.: 16/660,914

(22) Filed: Oct. 23, 2019

(65) Prior Publication Data
US 2020/0057772 A1 Feb. 20, 2020

Related U.S. Application Data

(63) Continuation of application No. PCT/EP2018/058984, filed on Apr. 9, 2018.

(30) Foreign Application Priority Data

May 15, 2017 (DE) ..................... 10 2017 208 123.6

(51) Int. Cl.
*G06F 16/29* (2019.01)
*G01C 21/00* (2006.01)
(Continued)

(52) U.S. Cl.
CPC ......... *G06F 16/29* (2019.01); *G01C 21/3423* (2013.01); *G01C 21/3697* (2013.01);
(Continued)

(58) Field of Classification Search
CPC .......... G06F 15/00; G06F 16/29; G06F 9/544; H04W 4/024; H04W 12/00; H04W 4/02;
(Continued)

(56) References Cited

U.S. PATENT DOCUMENTS

| 2005/0197775 A1* | 9/2005 | Smith | ................... | G08B 21/10 |
| | | | | 340/995.13 |
| 2007/0049260 A1* | 3/2007 | Yuhara | ................... | H04L 67/52 |
| | | | | 455/414.3 |

(Continued)

FOREIGN PATENT DOCUMENTS

| CN | 1657880 A | 8/2005 |
| CN | 102682495 A | 9/2012 |

(Continued)

OTHER PUBLICATIONS

International Search Report (PCT/ISA/210) issued in PCT Application No. PCT/EP2018/058984 dated Jul. 9, 2018 with English translation (four (4) pages).

(Continued)

*Primary Examiner* — Adam D Tissot
*Assistant Examiner* — Aarron E Santos
(74) *Attorney, Agent, or Firm* — Crowell & Moring LLP

(57) ABSTRACT

A method determines a weather area for a motor vehicle, with which a sensor system and a communications interface are associated, which are coupled to one another via signals. The method includes: receiving data including geographical information in the form of a map; and creating a grid by dividing the received data into a plurality of adjacent grid cells. The method also includes: providing a measurement signal of the sensor system, representing a location-related local weather situation in one of the grid cells; and determining a local weather area for the respective grid cell according to the provided measurement signal.

12 Claims, 6 Drawing Sheets

(51) Int. Cl.
  *G01C 21/34*   (2006.01)
  *G01C 21/36*   (2006.01)
  *G01W 1/10*    (2006.01)
  *G08G 1/0967*  (2006.01)
  *G09B 29/10*   (2006.01)
  *H04W 4/024*   (2018.01)

(52) U.S. Cl.
  CPC ........... *G01C 21/3881* (2020.08); *G01W 1/10* (2013.01); *G08G 1/096741* (2013.01); *G08G 1/096775* (2013.01); *G09B 29/106* (2013.01); *H04W 4/024* (2018.02)

(58) Field of Classification Search
  CPC ............ G01C 21/3423; G01C 21/3694; G01C 21/3697; G01C 21/32; G01C 21/34; G01C 21/3611; G01C 21/362; G01C 21/3691; G08G 5/0026; G08G 1/0967; G08G 1/096741; G08G 1/096775; G08G 1/161; G08G 5/0013; G08G 5/0021; G08G 5/003; G08G 5/0034; G08G 5/0052; G08G 5/0091; G09B 29/106
  See application file for complete search history.

(56) References Cited

U.S. PATENT DOCUMENTS

| | | |
|---|---|---|
| 2008/0215202 A1 | 9/2008 | Breed |
| 2012/0215446 A1* | 8/2012 | Schunder ............ H04L 67/125 |
| | | 702/3 |
| 2013/0304379 A1 | 11/2013 | Fulger et al. |

FOREIGN PATENT DOCUMENTS

| | | | |
|---|---|---|---|
| CN | 103270780 A | | 8/2013 |
| DE | 10 2007 063 011 A1 | | 6/2009 |
| EP | 1 566 665 A1 | | 8/2005 |
| EP | 3 318 846 A1 | | 5/2018 |
| JP | 11-316126 A | | 11/1999 |
| JP | 20070060851 A | * | 6/2007 |
| KR | 20070060851 A | * | 6/2007 |

OTHER PUBLICATIONS

German-language Written Opinion (PCT/ISA/237) issued in PCT Application No. PCT/EP2018/058984 dated Jul. 9, 2018 (nine (9) pages).
Chinese-language Office Action issued in Chinese Application No. 201880021336.2 dated Apr. 18, 2023 with English translation (19 pages).
Chinese-language Office Action issued in Chinese Application No. 201880021336.2 dated Nov. 23, 2022 with English Translation (16 pages).

* cited by examiner

METHOD, DEVICE, AND SYSTEM FOR DETERMINING A WEATHER AREA

CROSS REFERENCE TO RELATED APPLICATIONS

This application is a continuation of PCT International Application No. PCT/EP2018/058984, filed Apr. 9, 2018, which claims priority under 35 U.S.C. § 119 from German Patent Application No. 10 2017 208 123.6, filed May 15, 2017, the entire disclosures of which are herein expressly incorporated by reference.

BACKGROUND AND SUMMARY OF THE INVENTION

The invention relates to a method, an apparatus and a system for determining a weather area, which each facilitate a reliable and precise capture of a weather area and contribute to a low false reporting rate.

As a rule, motor vehicles have a multiplicity of sensors and navigation systems that facilitate the capture of various measured variables with an associated location reference. A sensor system installed in a motor vehicle can be used to obtain information about current weather properties and provide this information to the road traffic. It is therefore desirable to generate accurate weather information and keep false reports to a minimum.

An object on which the invention is based is that of developing a method, an apparatus and a system for determining a weather area, which each facilitate a reliable and precise capture of a weather area and contribute to a low false reporting rate.

According to one aspect of the invention, a method is provided for determining a weather area for a motor vehicle associated with a sensor system and a communications interface, which are signal-coupled to one another. The method receives data that comprise geographic information in the form of a map and creates a grid by subdividing the received data into a plurality of mutually adjoining grid cells. Further, the method provides a measurement signal of the sensor system that is representative of a location-related local weather situation in one of the grid cells and determines of a local weather area for a respective grid cell depending on the measurement signal provided.

The described method allows a reliable and locally precise identification of a weather area which, more particularly, can contribute to a low false reporting rate. Here, the weather area is associated with one or more grid cells on the basis of the received cartographic data and the created grid, and can consequently be localized in a corresponding region. Such a region comprises one or more grid cells which, for example, each have an edge length of one kilometer. Thus, for adjacent roads, a weather area is not only determined for a road on which the respective motor vehicle is currently traveling, for example, but the determined weather area also comprises the routes that are situated within the respective grid cells.

The data containing geographic information in the form of a map or street map may be provided, in particular, on an external server unit or by a map producer and can be retrieved within the scope of the method. Consequently, the described method more particularly realizes a geo-referenced fusion of determined weather data with available map data such that a simple and reliable determination and localization of the weather area is attainable.

In particular, within the scope of the method, a plurality of determined weather areas can be provided in associated grid cells, evaluated and compared to one another such that a respective determined weather area can be verified by a further motor vehicle so as to contribute to a particularly accurate and low-error capture of a contiguous weather area. The data to be processed, which contain geographic information and the recorded geo-referenced information about a local weather area, can be transmitted to a server unit or a backend and can be saved and processed in an associated database. Here, the captured measured variables or the generated measurement signals contain, in particular, position information which was determined by means of a locating system, for example, and which is assigned to the identified weather area.

The data about one or more weather areas can be determined by a so-called crowdsourcing method, in which the motor vehicles of the road users produce data for determining the position of the weather area. As a result, it is possible to produce current data for a weather area with comparatively little outlay and determine an extent of the weather area on the basis of the grid subdivision. Further, the current position of a migrating weather area can be captured.

The external server unit realizes a backend which is embodied to receive, provide and transmit data. Additionally, a further backend can be embodied as a unit separate from the server unit, said separate unit facilitating a data transfer and/or data processing within the scope of the method. Consequently, a grid-based reconstruction of a weather area by crowdsourcing in a backend is possible by use of the method.

In respect of the described measurement signals, the sensor system comprises a respective sensor or a respective apparatus that facilitates a capture of a physical characteristic and a generation of the associated measurement signal. Thus, the sensor system comprises, for example, a camera, a position sensor, a rain sensor and/or a brightness sensor, which is realized as a photodiode, for example.

According to a preferred development, the method comprises a determination of the local weather area for a respective grid cell and for the grid cells adjoining said grid cell depending on the measurement signal of the sensor system. The method allows hazardous weather situations to be identified in a reliable and location-referenced manner by means of the motor vehicle sensor system. The grid-based method facilitates an accurate determination of the weather area and a geographic extent of weather phenomena is taken into account, particularly in a manner involving a link to various other motor vehicles. Within the scope of the method, potential hazard warnings are provided not only along the road sections on which a motor vehicle has in fact identified a hazardous weather situation since a hazardous situation is very likely on the roads within the immediate surroundings. The surroundings are included by the respective grid cell and preferably also by the grid cells formed adjacent thereto.

Moreover, the method may comprise a creation of a warning message depending on the measurement signal of the sensor system. Such a warning message can be generated and provided in the external server unit and can be presented to following motor vehicles in a targeted manner as a warning before these reach the hazardous weather area. By way of example, information is displayed by means of an associated control unit, said information display suggesting a reduction in the speed depending on the determined weather area.

The method substantially realizes an efficient approach for aggregating geographically extensive warning reports due to weather from a fleet of motor vehicles, in which the rate of false reports can be reduced by means of multiple confirmations by a plurality of different motor vehicles of the warning reports and of the determined weather area. In particular, the described method can be implemented efficiently on a scalable backend infrastructure. A location-related encoding of the grid cells with a fixed precision moreover facilitates a memory-efficient representation of the created grid.

The information arriving in the server unit is processed and evaluated and preferably not directly forwarded to other road users. Direct forwarding of data would have the consequence that sensor noise and false identifications are also sent directly to other road users and consequently generate and disseminate false reports.

In particular, an edge length of the individual grid cell can be formed in predetermined fashion within the method depending on the weather area to be determined. According to a preferred development, the method comprises a construction of a trajectory of the motor vehicle depending on the measurement signal of the sensor system and a determination of an overlap between the constructed trajectory and a respective grid cell. Thereupon, the method further comprises a determination of the local weather area for a respective grid cell depending on the determined overlap. The weather area can be identified in location-related fashion and localized on the basis of the determined overlap.

According to a development, the method comprises a setting of respectively one numerical counter for a respective grid cell, said numerical counter having a predetermined value depending on the measurement signal of the sensor system, and an incrementing of the respective numerical counter of the grid cell when a measurement signal of the sensor system is provided for the grid cell and/or a weather area is determined for the grid cell. According to a further development, the method comprises a setting of respectively one temporal counter for a respective grid cell, said temporal counter having a predetermined value depending on the measurement signal of the sensor system and being representative of a predetermined time interval, and a resetting of the respective temporal counter of the grid cell when a measurement signal of the sensor system is provided for the grid cell and/or a weather area is determined for the grid cell.

By way of example, the numerical counter may contain the information that a weather area was determined and the state of an associated grid cell is set to "active". The predetermined temporal counter avoids repeat reports from a motor vehicle within the predetermined time interval such that, for example, after expiry of such a time interval, the state of the grid cell is set to "not active" and a determination of the weather area by the motor vehicle is subsequently possible again within this grid cell.

Moreover, incrementing or resetting of the numerical and/or temporal counter can be carried out for the grid cell for which a weather area is determined and, moreover, for the grid cells neighboring or adjoining said grid cell.

According to a development, the method comprises a determination of a current driving behavior of the motor vehicle depending on measurement signals of the sensor system and a determination of the local weather area for a respective grid cell depending on the determined driving behavior. By way of example, the determination of the driving behavior can comprise a determination of a current speed and/or a braking event of the motor vehicle. By way of example, the reduction in the speed of the motor vehicle can be detected by a speed sensor or position sensor and can be used to check the plausibility of the determined weather area. As a rule, an identifiable reduction in speed of motor vehicles can be identified when these drive into an area of poor weather.

In particular, the method may also comprise a determination of a local speed profile depending on a plurality of respectively determined speeds of a respective motor vehicle. In this way, a driving behavior can be taken into account in the detection of the weather area and thereby check the plausibility of the determined weather area in order to keep a false identification rate low.

In particular, the method according to a preferred development may comprise a provision and evaluation of a plurality of respectively determined weather areas, which are associated with different motor vehicles. An extent of a respective weather area can be determined in particularly reliable and precise fashion on the basis of a plurality of weather information items from various motor vehicles and a false reporting rate can be kept low.

The method can be carried out on the part of the motor vehicle; however, on account of a multiplicity of information items to process and a multiplicity of determined data which may be accumulated within the scope of a vehicle fleet with a multiplicity of motor vehicles, the received data are advantageously processed and evaluated and the weather area is advantageously determined and checked in respect of plausibility in an external server unit and/or backend.

A respective motor vehicle which is associated with an appropriate sensor system and a communications system consequently realizes a mobile measuring station for determining a weather area such that at least a capture of weather-associated characteristics and a generation of measurement signals by means of the sensor system and the transfer of the recorded measurement signals and/or evaluated data are carried out on the part of the motor vehicle. The respective recorded measurement signal and/or the determined location-related weather area can be transmitted to the external server unit by means of the communications interface and can be processed according to the method described.

Consequently, the described method facilitates the collection and aggregation of a multiplicity of determined or ascertainable weather areas, which can be compared to one another and, as a result, can be verified with a low false reporting rate, and which further facilitate a creation of a useful weather map with weather areas that have been checked in respect of their plausibility. This facilitates a useful mapping of various weather areas such that following motor vehicles are warned in advance in relation to the weather area and alternative routes, for example, may be taken into consideration. In particular, the accuracy when determining a weather area is increased by means of the described method by virtue of a contiguous weather area being determined, delimited and checked in respect of its plausibility by various motor vehicles in each case such that this contributes to a low false reporting rate.

The method realizes a grid-based aggregation of the received data in the server unit, in which the surface of the globe, as provided geographic data, is initially covered with the grid over its entire area and subdivided into grid cells, the edge length of the grid cells being predetermined to be shorter than a characteristic extent of the weather areas to be reconstructed. By way of example, grid cells for reconstructing an area of rain have an edge length of one kilometer.

Approximate polyline trajectories are reconstructed virtually in real time from the warning messages transmitted by each motor vehicle. If a grid cell is intersected by such a trajectory, a numerical counter is incremented and/or a temporal counter is reset for this grid cell. In order to avoid gaps between the reconstructed weather areas, the respective counters of all eight neighboring cells are moreover updated. However, this increment per motor vehicle is preferably only carried out once at most within a predetermined time interval in order to avoid repeat reports from a single motor vehicle.

Further criteria such as the above-described driving behavior can also be used in addition to the pure intersection of trajectories with grid cells for the purposes of checking the plausibility of the identification of a weather-related hazardous situation.

A further aspect of the invention relates to an apparatus for determining a weather area, said apparatus being configured to carry out one of the above-described methods. By way of example, such an apparatus is realized as a server unit or backend and embodied to receive, process and transmit data that are determined or evaluated in conjunction with the method. As an alternative or in addition thereto, a control unit of the motor vehicle can also be enabled to be an apparatus for detecting a weather area and for carrying out one of the described methods. However, in particular in view of a multiplicity of measurement signals, data and information items to be processed from different motor vehicles, the method described is preferably carried out in a backend that is external to the motor vehicle.

Moreover, a further aspect of the invention relates to a system for determining a weather area, which comprises a motor vehicle and an embodiment of the above-described apparatus. The motor vehicle comprises the sensor system and the communications interface and thus realizes a mobile measuring station for detecting the weather area and, in particular, facilitates an identification of weather areas, and a checking of the plausibility thereof, with a low false identification rate, particularly in conjunction with a multiplicity of such motor vehicles within a vehicle fleet.

Other objects, advantages and novel features of the present invention will become apparent from the following detailed description of one or more preferred embodiments when considered in conjunction with the accompanying drawings.

Elements of the same construction or function have been labeled with the same reference signs in all the figures. For reasons of clarity, the illustrated elements may not be labeled with reference signs in all figures.

DETAILED DESCRIPTION OF THE DRAWINGS

Figure 1:
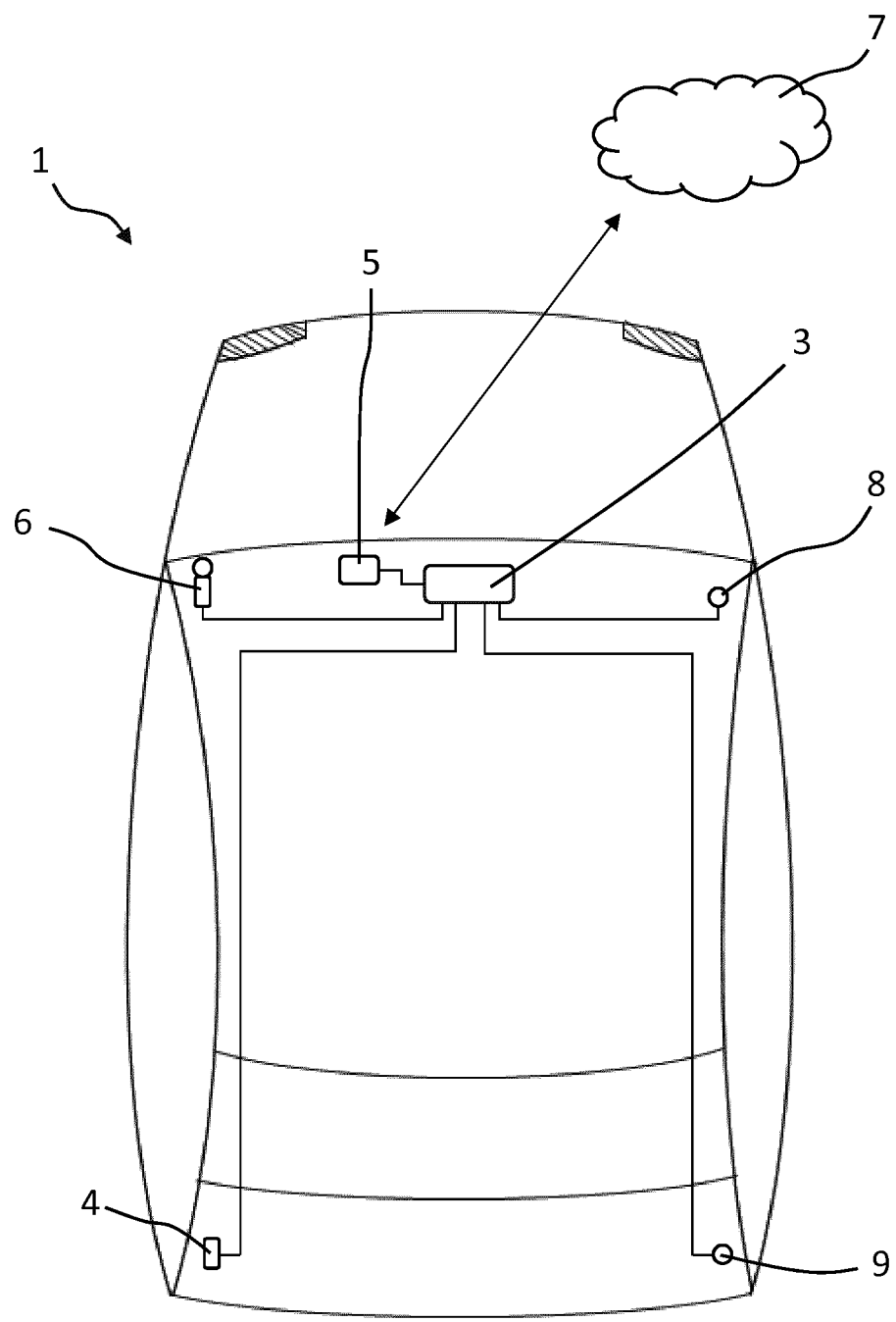
FIG. 1 shows a schematic exemplary embodiment of a system for determining a weather area.

FIG. 1 illustrates an exemplary embodiment of a system for determining a weather area 10 with a motor vehicle 1 in a schematic plan view. The system further comprises an arrangement that comprises a communications interface 5 and a sensor system 4, 6, 8, 9, which is signal-coupled to the communications interface 5 by means of a control unit 3 of the motor vehicle 1. The communications interface 5 is configured for bidirectional communication with a server unit 7 that is external to the motor vehicle 1 and for transmitting data to and receiving data from said server unit.

The arrangement with the sensor system 4, 6, 8, 9 and the communications interface 5 facilitates the capture of a respective physical characteristic and the generation of an associated measurement signal, which is processed for the purposes of determining a weather area 10. As will be explained on the basis of subsequent FIGS. 2 to 5, the system and the method facilitate a reliable and precise identification of a weather area 10 and contribute to a low false reporting rate, which may have a further advantageous effect on the associated road traffic.

The sensor system facilitates the capture of measurement signals that comprise data with weather-related information or at least information that may have an effect on the determination of the weather area 10. By way of example, the sensor system comprises a position sensor 4, a camera 6, a rain sensor 8 and a brightness sensor 9 for capturing associated characteristics and producing associated measurement signals. The position sensor 4, for example a GNSS sensor according to a satellite-based positioning system, allows recorded measurement signals to be location-related and geo-referenced.

The respective measurement signals can be generated by means of the sensor system and can be transmitted for storage and processing purposes to the external server unit 7 and/or a backend 20 (see FIG. 2) by means of the communications interface 5. Capturing measurement signals and transmitting and receiving data can be controlled by the control unit 3. Determining data or characteristics and carrying out the method are preferably implemented by a computing and memory unit of the server unit 7 and/or of the backend 20. As an alternative or in addition thereto, method steps can also be carried out on the part of the vehicle in the control unit 3, which is then appropriately enabled to this end. Here, the server unit 7 and the backend 20 can realize two mutually separate units and can be embodied as a common central unit.

Figure 2:
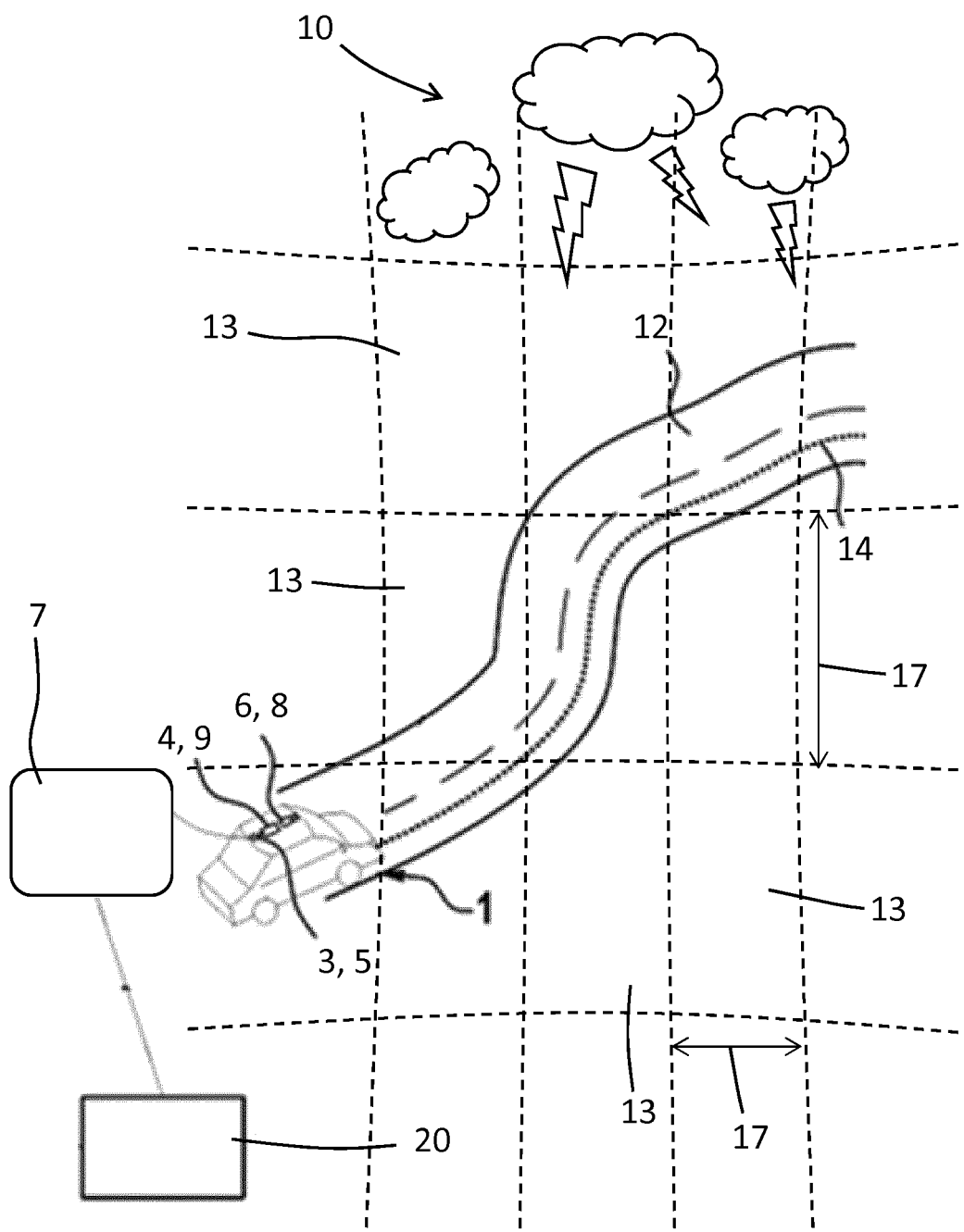
FIG. 2 shows a further schematic exemplary embodiment of the system for determining a weather area.

FIG. 2 schematically illustrates the system according to FIG. 1 on a road section 12 that leads through a weather area 10 with an indicated thunderstorm. The motor vehicle 1 comprises the sensor system 4, 6, 8, 9, the control unit 3 and the communications interface 5. By way of example, the motor vehicle 1 represents an automobile and it follows the course of the road such that a trajectory 14 of a route of the motor vehicle 1 can be determined by means of the position sensor 4. Further, an actual speed can be determined as current speed of the motor vehicle 1 by means of the position sensor 4 or by way of the wheel speed.

The captured events, such as the identification of rain, the identification of the ambient brightness, the trajectory 14 and/or the captured speed, for example, are transferred by the motor vehicle 1 to a receiver of the server unit 7 and/or of the backend 20 via a wireless network connection by way of the communications interface 5. The events received by the respective receiver comprise the type of event and a position, for example a GNSS position, and said events are geo-referenced.

Moreover, data that contain geographic information, for example in the form of a street map or map, are processed within the scope of the method for determining the weather area 10. The available map is subdivided into individual grid cells 13 by creating a grid, said grid cells adjoining one another and having a respective edge length 17. The respective length and a respective width of the respective grid cells 13 can be configured to be the same or different, and so the grid cells 13 accordingly have a rectangular or square embodiment.

Figure 5:
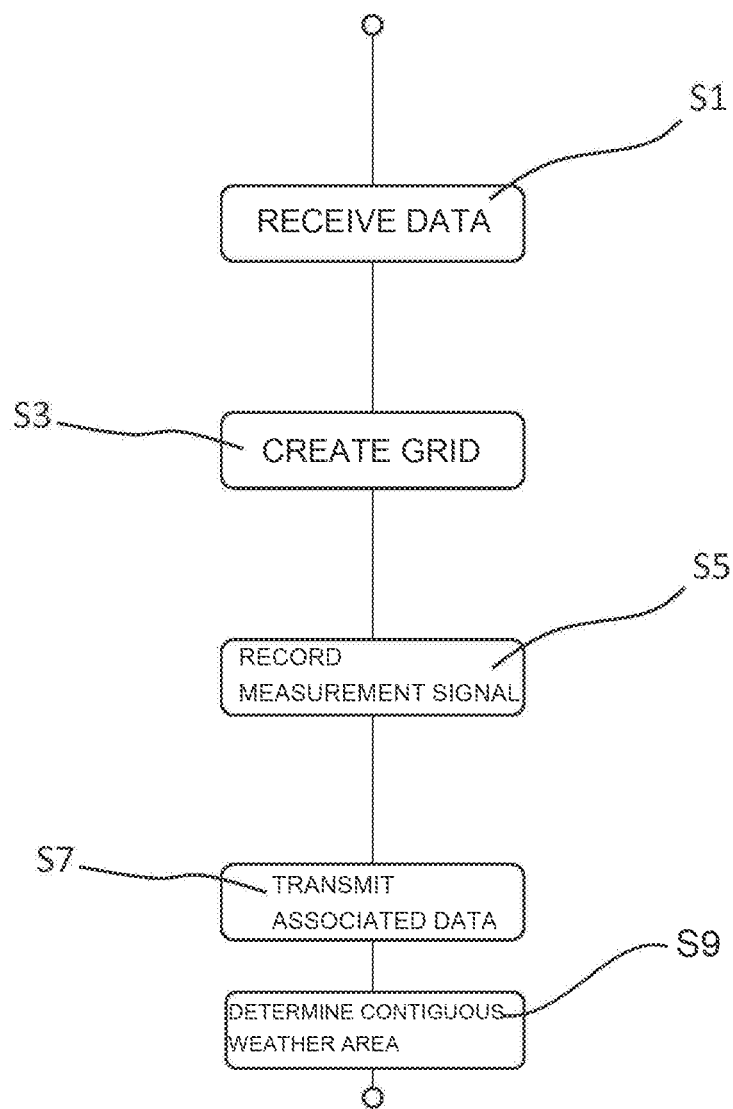
FIG. 5 shows a schematic flowchart for a method for determining a weather area.

FIGS. 3A to 3D schematically illustrate individual steps of the method for identifying the weather area 10 and checking the plausibility thereof, said method being able to be carried out according to the flowchart according to FIG. 5. In a step S1 of the method, for example, available data are received from the server unit 7 and/or the backend 20, said data comprising map information with geographic data. By way of example, these data can be provided in the form of a digital street map or map by a map producer.

Figure 3A:
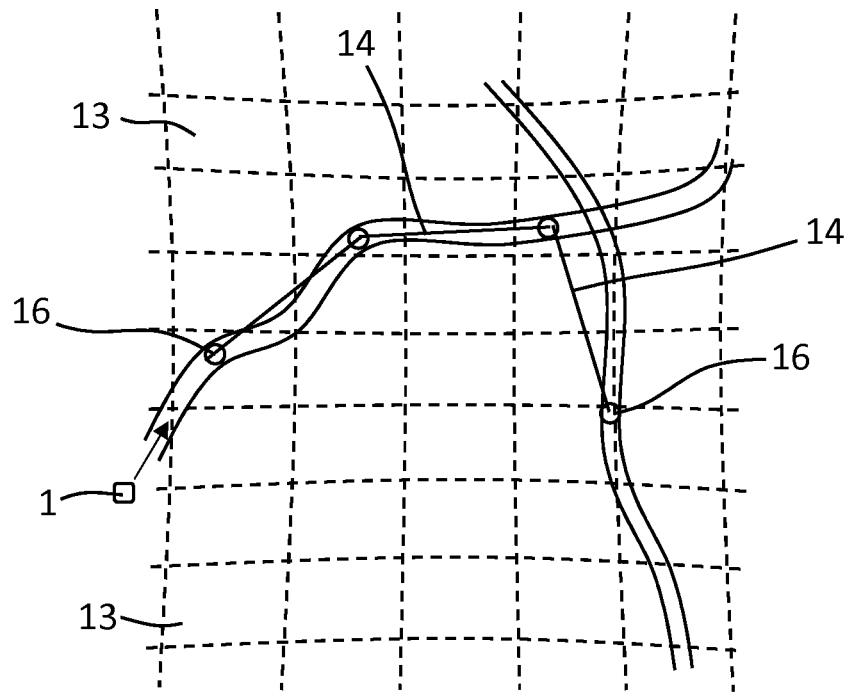
FIGS. 3A-3D show a schematic exemplary embodiment for determining a weather area.
Figure 3B:
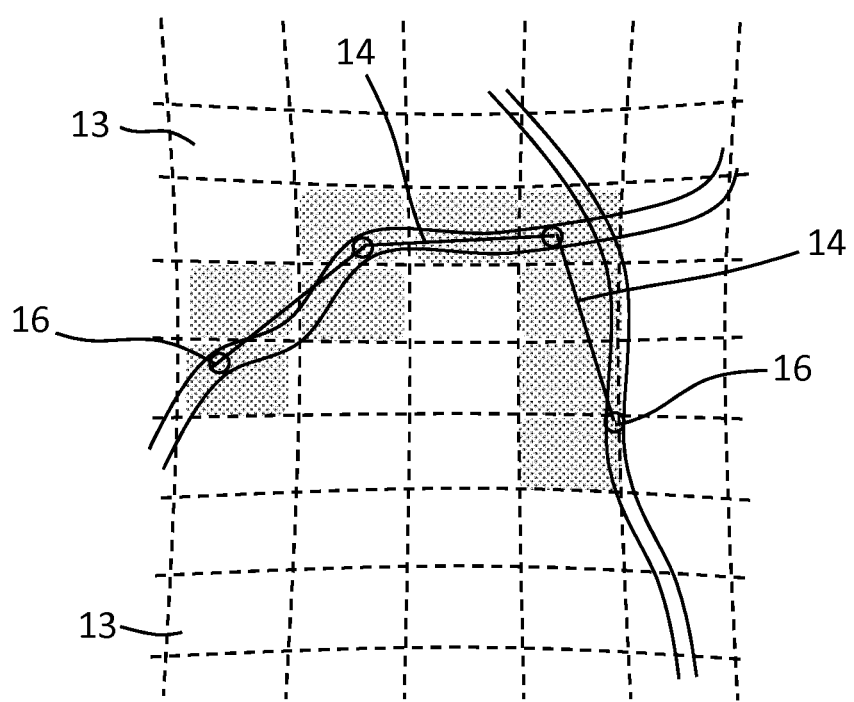

In a step S3 of the method, the provided map is subdivided according to a grid by a multiplicity of grid cells 13 with a predetermined edge length 17 (see FIG. 3A). By way of example, the edge length 17 is configured so as to be matched to the weather area 10 to be determined, such that, for example in the case of rain, an edge length 17 of one kilometer can be considered to be useful.

In a further step S5, a measurement signal is recorded by the rain sensor 8, for example, and there is a determination as to whether or not rain is present. Recording a measurement value in this way and determining a weather area 10 can be carried out at predetermined time intervals, for example every minute in cyclical fashion. As an alternative or in addition thereto, the recording of the measurement values can be carried out depending on the speed of the motor vehicle 1, since longer or shorter route sections of the route are traversed in accordance with the speed. The positions where measurement values are recorded realize geo-referenced update positions 16, on the basis of which the trajectory 14 of the motor vehicle 1 can be determined; by way of example, said trajectory can be formed as a stringing together of straight sections between respectively two update positions 16 (see FIG. 3A).

By way of example, the recording of a measurement value is carried out and an update position 16 is formed every 60 seconds and/or every two kilometers, preferably whichever of the two occurs first. Other values for an update time or an update location may also be predetermined depending on the choice of a cell size of the respective grid cells 13, for example in order to ensure there is, depending on the edge length 17 and the cell dimensions of the respective grid cells 13 resulting therefrom, at least one measurement point per grid cell 13 and trajectory 14.

By way of example, if a hazardous weather situation is detected, the associated data are transmitted to the external server unit 7 and/or the backend 20 in a further step S7. By way of example, hazardous weather regions may be reconstructed from at least M contiguous grid cells 13, which were intersected by at least N trajectories 14 within the last T seconds. Sensor noise and false reports can be reduced by virtue of the number of trajectories being chosen such that N>1 and consequently warning reports from a plurality of motor vehicles 1 being required in each grid cell 13 as confirmation. Each intersected grid cell 13 is considered marked and the grid cells 13 adjacent thereto are also put into the "active" state (cf. FIGS. 3B and 3C).

Figure 3C:
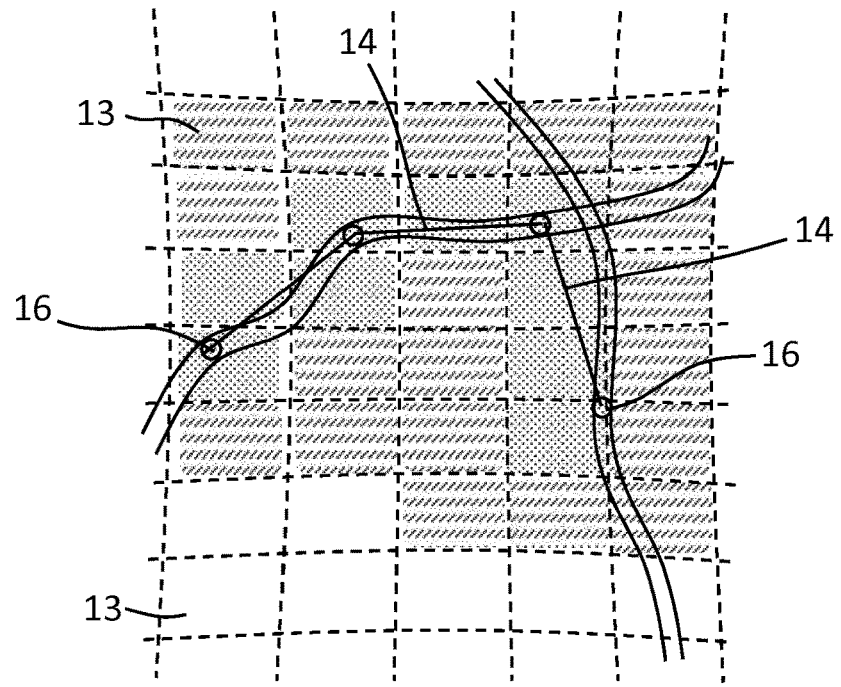
Figure 3D:
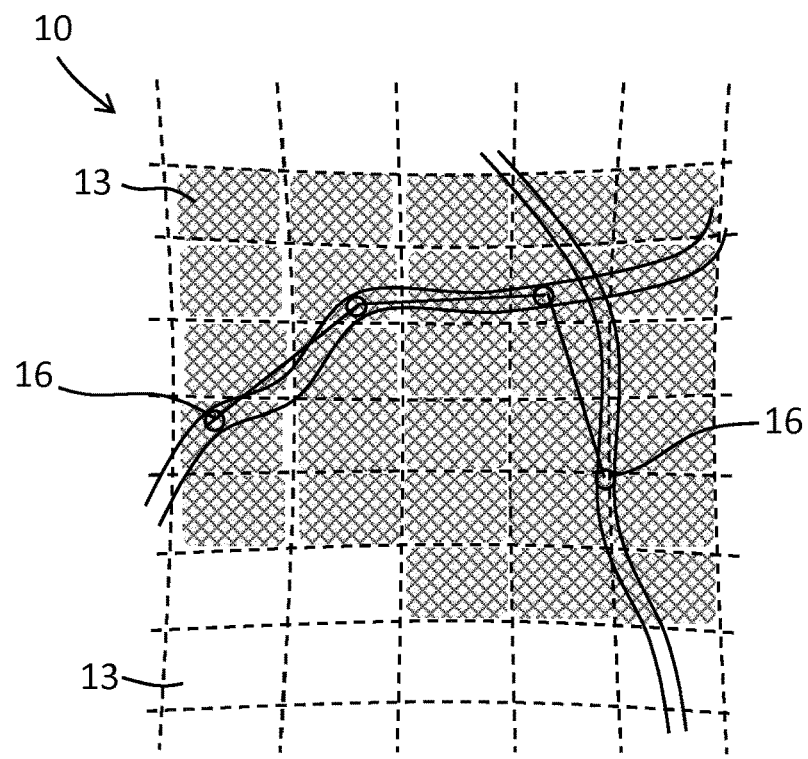

In a further step S9, a contiguous weather area 10 is determined on the basis of the grid cells 13 considered active (cf. FIG. 3D). As soon as a contiguous weather region 10 has been reconstructed, a timer or temporal counter can be started for all active grid cells 13 in this region. If new warning messages within a grid cell 13 are received or determined on the basis of the corresponding trajectories 14, the timer of said grid cell is reset. After the timer has expired, the corresponding grid cell 13 is set to be inactive again. By way of example, this allows a representation of moving weather regions.

Now, warning messages can be output on the basis of the determined weather areas for all roads that are covered by the grid cells of the reconstructed weather area 10.

Figure 4A:
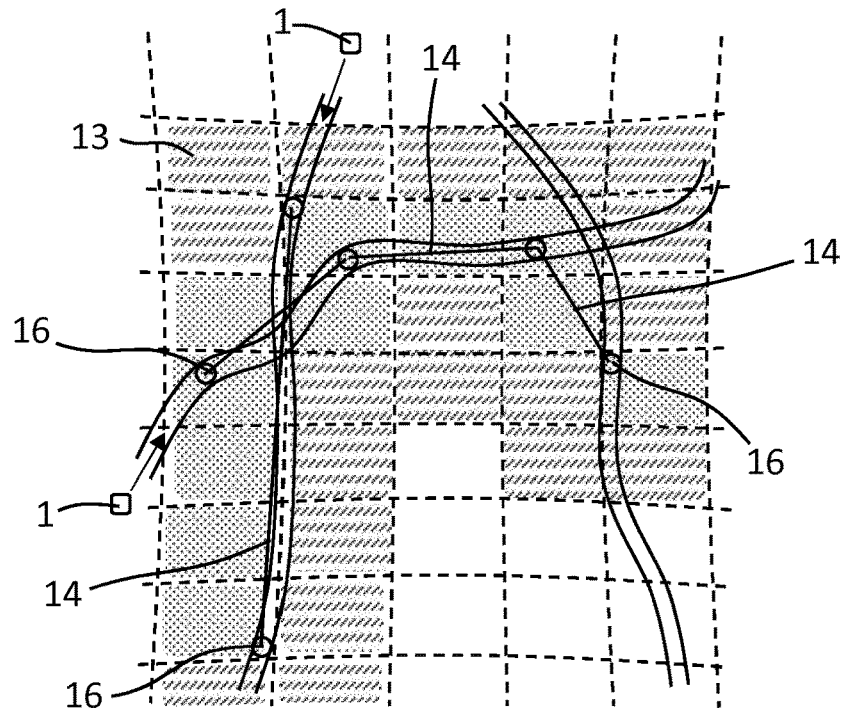
FIGS. 4A-4B show a schematic exemplary embodiment for determining a weather area.
Figure 4B:
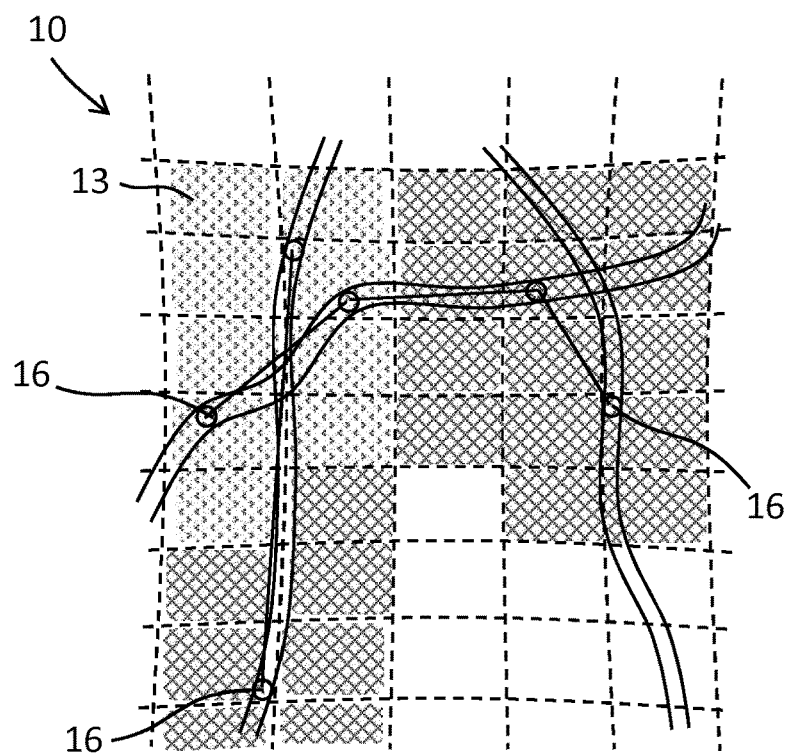

FIGS. 4A and 4B illustrate, in a manner analogous to FIGS. 3C and 3D, the marking of grid cells 13 and the associated determined weather area 10, which was determined by two motor vehicles 1, in contrast to the exemplary embodiment according to FIGS. 3A to 3D. Particularly in the region of overlap of marked grid cells 13 or grid cells set to be active (the grid cells 13 marked in the upper left image region), there is a higher accuracy of the determined weather area 10 since said grill cells were traversed by two different motor vehicles and the plausibility of the respectively determined weather area 10 was checked by the other motor vehicle 1. In particular, a warning report can be output for the overlap region of respectively determined weather areas 10.

Moreover, within the scope of the method, a multiplicity of such captured data and determined information items, in particular, can be evaluated, said data and information being processed together by way of the server unit 7 and/or the backend 20 in each case according to the motor vehicle 1 in collaboration as a vehicle fleet of different motor vehicles 1. Such a method makes use of, in particular, a linking of motor vehicles 1 among themselves or a linking of a multiplicity of motor vehicles 1 with the external server unit 7 and/or the backend 20 such that, on account of the fusion of determined data with received map information and a verification by means of so-called crowdsourcing, a particularly reliable determination of the weather area 10, and check of the plausibility thereof, is possible and this can contribute to a low false reporting rate.

LIST OF REFERENCE SIGNS

1 Motor vehicle
3 Control unit
4 Position sensor
5 Communications interface
6 Camera
7 Server unit
8 Rain sensor
9 Brightness sensor
10 Thunderstorm area
11 Grid
12 Road section
14 Trajectory of the motor vehicle
16 Update position
20 Backend
S(i) Respective step of a method for reconstructing roadwork for a motor vehicle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for determining a weather area for a motor vehicle comprising a sensor system and a communication interface that are signal-coupled to one another, the method comprising:

receiving data that comprise geographic information in a form of a map;
creating a grid by subdividing the received data into a plurality of mutually adjoining grid cells;
providing a measurement signal of the sensor system that is representative of a location-related local weather situation in one of the grid cells;
determining a local weather area for a respective grid cell depending on the measurement signal provided;
setting respectively one temporal counter for a respective grid cell, said temporal counter having a predetermined value depending on the measurement signal of the sensor system and being representative of a predetermined time interval during which an additional determination of the local weather area for the respective grid cell by the motor vehicle is prevented; and
resetting the respective temporal counter of the grid cell for which the measurement signal of the sensor system is provided and/or for which the local weather area is determined,
wherein the measurement signal of the sensor system comprises a weather-associated characteristic of the location-related local weather situation in one of the grid cells.

2. The method according to claim 1, further comprising:
determining the local weather area for the respective grid cell and for the grid cells adjoining said grid cell depending on the measurement signal of the sensor system.

3. The method according to claim 1, further comprising:
creating a warning message depending on the measurement signal of a sensor system; and
outputting the created warning message to a motor vehicle when the latter approaches the determined weather area.

4. The method according to claim 1, wherein
an edge length of a respective grid cell is formed in predetermined fashion depending on the weather area to be determined.

5. The method according to claim 1, further comprising:
constructing a trajectory of the motor vehicle depending on the measurement signal of the sensor system;
determining an overlap between the constructed trajectory and respective grid cell; and
determining the local weather area for a respective grid cell depending on the determined overlap.

6. The method according to claim 1, further comprising:
setting respectively one numerical counter for a respective grid cell, said numerical counter having a predetermined value depending on the measurement signal of the sensor system; and
incrementing the respective numerical counter of the grid cell for which a measurement signal of the sensor system is provided and/or for which a weather area is determined.

7. The method according to claim 1, further comprising:
resetting the respective temporal counter of the grid cell for which a weather area is determined and for the grid cells adjoining said grid cell.

8. The method according to claim 6, further comprising:
incrementing the respective numerical counter of the grid cell for which a weather area is determined and for the grid cells adjoining said grid cell.

9. The method according to claim 1, further comprising:
determining a current driving behavior of the motor vehicle depending on measurement signals of the sensor system; and
determining the local weather area for a respective grid cell depending on the determined driving behavior.

10. The method according to claim 1, further comprising:
providing a plurality of respectively determined weather areas, which are associated with different motor vehicles; and
evaluating the plurality of determined weather areas and determining an extent of a respective weather area.

11. An apparatus for determining a weather area, the apparatus comprising:
one or more processors and associated memory having stored thereon program code that, when executed, carry out the acts of:
receiving data that comprise geographic information in a form of a map;
creating a grid by subdividing the received data into a plurality of mutually adjoining grid cells;
providing a measurement signal of the sensor system that is representative of a location-related local weather situation in one of the grid cells;
determining a local weather area for a respective grid cell depending on the measurement signal provided;
setting respectively one temporal counter for a respective grid cell, said temporal counter having a predetermined value depending on the measurement signal of the sensor system and being representative of a predetermined time interval during which an additional determination of the local weather area for the respective grid cell by the motor vehicle is prevented; and
resetting the respective temporal counter of the grid cell for which the measurement signal of the sensor system is provided and/or for which the local weather area is determined,
wherein the measurement signal of the sensor system comprises a weather-associated characteristic of the location-related local weather situation in one of the grid cells.

12. A motor vehicle, comprising:
an apparatus according to claim 11;
a control unit;
a sensor system and a communications interface, wherein the control unit, the sensor system and the communication interface are signal-coupled to one another.

\* \* \* \* \*